United States Patent
Giaconi et al.

(10) Patent No.: US 11,973,778 B2
(45) Date of Patent: Apr. 30, 2024

(54) DETECTING ANOMALIES IN COMPUTER NETWORKS

(71) Applicant: BRITISH TELECOMMUNICATIONS PUBLIC LIMITED COMPANY, London (GB)

(72) Inventors: Giulio Giaconi, London (GB); Yipeng Cheng, London (GB)

(73) Assignee: British Telecommunications Public Limited Company (GB)

( * ) Notice: Subject to any disclaimer, the term of this patent is extended or adjusted under 35 U.S.C. 154(b) by 320 days.

(21) Appl. No.: 17/309,528

(22) PCT Filed: Dec. 1, 2019

(86) PCT No.: PCT/EP2019/083205
§ 371 (c)(1),
(2) Date: Jun. 3, 2021

(87) PCT Pub. No.: WO2020/114922
PCT Pub. Date: Jun. 11, 2020

(65) Prior Publication Data
US 2022/0060492 A1     Feb. 24, 2022

(30) Foreign Application Priority Data
Dec. 3, 2018 (EP) .................................... 18209889

(51) Int. Cl.
*H04L 9/40*     (2022.01)
*G06N 3/08*     (2023.01)

(52) U.S. Cl.
CPC ........... *H04L 63/1425* (2013.01); *G06N 3/08* (2013.01); *H04L 63/0245* (2013.01)

(58) Field of Classification Search
CPC ............. H04L 63/1408; H04L 63/1425; H04L 63/0245; G06N 3/044; G06N 3/08
See application file for complete search history.

(56) References Cited

U.S. PATENT DOCUMENTS

| 9,185,095 | B1 | 11/2015 | Moritz et al. |
| 9,514,293 | B1 | 12/2016 | Moritz et al. |

(Continued)

FOREIGN PATENT DOCUMENTS

| CN | 107633263 A | 1/2018 |
| CN | 107885999 A | 4/2018 |

(Continued)

OTHER PUBLICATIONS

Izakian et al. "Anomaly Detection and Characterization in Spatial Time Series Data: A Cluster-Centric Approach" [Online], Jan. 24, 2014 [Retrieved on: Sep. 6, 2023], www.ieee.org, Retrieved from: < https://ieeexplore.ieee.org/stamp/stamp.jsp?tp=&arnumber=6722892 > (Year: 2014).*

(Continued)

*Primary Examiner* — Eric W Shepperd
(74) *Attorney, Agent, or Firm* — Pranger Law PC

(57) ABSTRACT

A computer implemented method of detecting anomalous behavior within a computer network, the method including accessing data records each corresponding to an occurrence of communication occurring via the computer network and including a plurality of attributes of the communication; generating, for each of at least a subset of the data records, a training data item for a neural network, the training data item being derived from at least a portion of the attributes of the record and the neural network having input units and output units corresponding to items in a corpus of attribute values for communications occurring via the network; augmenting the training data by replicating each of one or more training data items responsive to one or more attributes of the data record corresponding to the training data item; training the neural network using the augmented training data so as to define a vector representation for each attribute value in the corpus based on weights in the neural network (Continued)

for an input unit corresponding to the attribute value; repeating the accessing, the generating, the augmenting and the training to generate multiple generations of vector representations for each attribute value in the corpus, each generation corresponding to data records received during a different time period; and for at least a subset of attribute values in the corpus, comparing the multiple generations of vector representations to identify a change in one or more vector representation as an indication of an anomalous change of behavior in the computer network.

13 Claims, 3 Drawing Sheets

(56) References Cited

U.S. PATENT DOCUMENTS

| | | | |
|---|---|---|---|
| 9,798,876 | B1 | 10/2017 | Parker-Wood et al. |
| 10,114,954 | B1 | 10/2018 | Bellis et al. |
| 10,749,883 | B1 | 8/2020 | Martin et al. |
| 10,793,286 | B1* | 10/2020 | Carrico ............ G02B 27/0101 |
| 10,949,534 | B2 | 3/2021 | Martin et al. |
| 11,108,787 | B1 | 8/2021 | Shen et al. |
| 2005/0114278 | A1* | 5/2005 | Saptharishi ............ G06N 3/082 706/46 |
| 2005/0193281 | A1 | 9/2005 | Ide et al. |
| 2007/0112824 | A1 | 5/2007 | Lock et al. |
| 2009/0172815 | A1 | 7/2009 | Gu et al. |
| 2009/0234899 | A1 | 9/2009 | Kramer |
| 2010/0114973 | A1 | 5/2010 | Goyal |
| 2011/0214157 | A1 | 9/2011 | Korsunsky et al. |
| 2011/0321164 | A1 | 12/2011 | Saxena et al. |
| 2012/0072983 | A1 | 3/2012 | Mccusker et al. |
| 2012/0131674 | A1 | 5/2012 | Wittenschlaeger |
| 2014/0096249 | A1 | 4/2014 | Dupont et al. |
| 2014/0173737 | A1 | 6/2014 | Toback et al. |
| 2014/0245443 | A1 | 8/2014 | Chakraborty |
| 2014/0279762 | A1 | 9/2014 | Xaypanya et al. |
| 2014/0283115 | A1 | 9/2014 | Ben-Natan et al. |
| 2015/0020199 | A1 | 1/2015 | Neil et al. |
| 2015/0269050 | A1 | 9/2015 | Filimonov et al. |
| 2016/0021141 | A1 | 1/2016 | Liu et al. |
| 2016/0164901 | A1 | 6/2016 | Mainieri et al. |
| 2016/0205122 | A1 | 7/2016 | Bassett |
| 2016/0359695 | A1 | 12/2016 | Yadav et al. |
| 2017/0126712 | A1 | 5/2017 | Crabtree et al. |
| 2017/0279698 | A1 | 9/2017 | Sartran et al. |
| 2017/0339022 | A1* | 11/2017 | Hegde ............... H04L 41/06 |
| 2018/0004948 | A1 | 1/2018 | Martin et al. |
| 2018/0103052 | A1 | 4/2018 | Choudhury et al. |
| 2018/0152468 | A1 | 5/2018 | Nor et al. |
| 2018/0219895 | A1 | 8/2018 | Silver et al. |
| 2018/0260562 | A1 | 9/2018 | Chen et al. |
| 2018/0276372 | A1 | 9/2018 | Crabtree et al. |
| 2018/0336437 | A1 | 11/2018 | Cheng et al. |
| 2018/0367548 | A1 | 12/2018 | Stokes et al. |
| 2018/0367553 | A1* | 12/2018 | Hayden ............... H04L 63/1425 |
| 2019/0102564 | A1 | 4/2019 | Li et al. |
| 2019/0132344 | A1 | 5/2019 | Lem et al. |
| 2019/0147333 | A1* | 5/2019 | Kallur Palli Kumar ................ G06V 10/451 706/25 |
| 2019/0173899 | A1 | 6/2019 | Tews et al. |
| 2019/0179878 | A1* | 6/2019 | Collins ............... G06N 5/02 |
| 2019/0260786 | A1* | 8/2019 | Dunn ............... G06F 18/23 |
| 2019/0312734 | A1 | 10/2019 | Wentz et al. |
| 2020/0067969 | A1 | 2/2020 | Abbaszadeh et al. |
| 2020/0097810 | A1* | 3/2020 | Hetherington ......... G06N 20/20 |
| 2020/0175161 | A1 | 6/2020 | Giaconi |
| 2020/0304523 | A1 | 9/2020 | Yadav et al. |
| 2022/0016455 | A1 | 1/2022 | Tohidi et al. |
| 2022/0027465 | A1 | 1/2022 | Hercock et al. |
| 2022/0027478 | A1 | 1/2022 | Hercock et al. |

FOREIGN PATENT DOCUMENTS

| | | |
|---|---|---|
| CN | 108108622 A | 6/2018 |
| EP | 3355547 A1 | 8/2018 |
| KR | 20180076753 A | 7/2018 |
| WO | 2017019391 A1 | 2/2017 |
| WO | 2017167544 A1 | 10/2017 |
| WO | 2017167545 A1 | 10/2017 |
| WO | 2018224669 A1 | 12/2018 |
| WO | 2018224670 A1 | 12/2018 |

OTHER PUBLICATIONS

Radford et al. "Network Traffic Anomaly Detection Using Recurrent Neural Networks" [Online], Mar. 28, 2018[Retrieved on: Sep. 6, 2023], www.arXiv.org, Retrieved from: < https://arxiv.org/pdf/1803.10769.pdf > (Year: 2018).*

Wong et al. "Understanding data augmentation for classification: when to warp?" [Online], Dec. 26, 2016[Retrieved on: Sep. 6, 2023], DICTA 2016, Retrieved from: < https://ieeexplore.ieee.org/stamp/stamp.jsp?tp=&arnumber=7797091 > (Year: 2016).*

Fawaz et al. "Data augmentation using synthetic data for time series classification with deep residual networks" [Online], Aug. 7, 2018 [Retrieved on: Sep. 6, 2023],www.arXiv.org, Retrieved from: < https://arxiv.org/pdf/1808.02455.pdf > (Year: 2018).*

Lim et al. "DOPING: Generative Data Augmentation for Unsupervised Anomaly Detection with GAN" [Online], Nov. 1, 2018 [Retrieved on: Sep. 6, 2023],www.arXiv.org, Retrieved from: < https://arxiv.org/pdf/1808.07632.pdf > (Year: 2018).*

Dau et al."Anomaly Detection Using Replicator Neural Networks Trained on Examples of One Class"[Online],Dec. 2014[Retrieved on: Sep. 9, 2023],Retrieved from: < https://www.researchgate.net/publication/312772302_Anomaly_Detection_Using_Replicator_Neural_Networks_Trained_on_Examples_of_One_Class> (Year: 2014).*

Cui et al. "Data Augmentation for Deep Neural Network Acoustic Modeling" [Online], Jun. 1, 2015 [Retrieved on: Sep. 9, 2023], www.ieee.org, Retrieved from: < https://ieeexplore.ieee.org/stamp/stamp.jsp?tp=&arnumber=7113823 > (Year: 2015).*

Mikolov et al. "Efficient Estimation of Word Representations in Vector Space" [Online], Sep. 7, 2013[Retrieved on: Sep. 9, 2023], www.arViv.org, Retrieved from: < https://arxiv.org/pdf/1301.3781.pdf > (Year: 2013).*

Ring et al. "IP2Vec: Learning Similarities between IP Addresses" [Online], Dec. 18, 2017 [Retrieved on: Sep. 9, 2023], IEEE, Retrieved from: < https://ieeexplore.ieee.org/stamp/stamp.jsp?tp=&arnumber=8215725 > (Year: 2017).*

Rumelhart et al. "Learning representations by back-propagating errors" [Online], Oct. 9, 1986 [Retrieved on: Sep. 9, 2023], Nature Journal, Retrieved from: < https://www.nature.com/articles/323533a0.pdf > (Year: 1986).*

An et al. "Variational Autoencoder based Anomaly Detection using Reconstruction Probability", Progress in Biomedical Optics and Imaging, SNU Data Mining Center, 2015-2 Special Lecture on IE, XP055491966, Dec. 27, 2015, 18 pages.

Campello et al. "Density-Based Clustering Based on Hierarchical Density Estimates", In Prosecution Advances in Knowledge Discovery and Data Mining, Part II, LNAI 7819, 2013, pp. 160-172.

Chandola et al. "Anomaly Detection for Discrete Sequences: A Survey", IEEE Transactions on Knowledge and Data Engineering, vol. 24, No. 5, May 2012, pp. 823-839.

Clinchant et al. "Aggregating Continuous Word Embeddings for Information Retrieval", Proceedings of the Workshop on Continuous Vector Space Models and their Compositionability, Aug. 9, 2013, pp. 100-109.

Combination Search and Examination Report under Sections 17 & 18(3) for Great Britain Application No. 1819711.1, mailed on Jun. 10, 2019, 5 pages.

Combined Search and Examination Report for Great Britain Application No. 1819704.6, mailed on Jun. 4, 2019, 5 pages.

Combined Search and Examination Report for Great Britain Application No. 1819705.3, mailed on May 28, 2019, 9 pages.

(56) References Cited

OTHER PUBLICATIONS

Combined Search and Examination Report for Great Britain Application No. 1819706.1, mailed on Jun. 4, 2019, 5 pages.
Combined Search and Examination Report for Great Britain Application No. 1917563.7, mailed on Apr. 24, 2020, 5 pages.
Combined Search and Examination Report under Sections 17 and 18(3) for Great Britain Application No. 1819703.8, mailed on May 13, 2019, 6 pages.
Combined Search and Examination Report under Sections 17 and 18(3) for Great Britain Application No. 1917557.9, mailed on May 20, 2020, 5 pages.
"Common Vulnerabilities and Exposures (CVE) repository", Mitre Corporation, accessed from the Internet: www.cvedetails.com & https://cve.mitre.org/, Dec. 2, 2018, 1 page.
CVSS, "Common Vulnerability Scoring System v3.0:Specification Document", CVSS v3.0 Specification (v1.3), retrieved from https://www.first.org/cvss/v3.0/specification-document, , 19 pages.
Despois, Julien, "Stop Feeding Garbage To Your Model !—The 6 biggest mistakes with datasets and how to avoid them", retrieved from https://hackernoon.com/stop-feedinggarbage-to-your-model-the-6-biggest-mistakes-with-datasets-and-how-to-avoid-them-3cb7532ad3b7, Mar. 16, 2018, 10 pages.
Eddy, Sean R. "What is a Hidden Markov Model?", Nature Biotechnology, vol. 22 No. 10, Oct. 2004, pp. 1315-1316.
Ester et al. "A Density-Based Algorithm for Discovering Clusters in Large Spatial Databases with Noise", Proceedings of Knowledge Discovery and Data Mining, AAAI, 1996, pp. 226-231.
Exploit Database "Offensive Security", Accessed from the internet: exploit-db.com, Dec. 2, 2018, 1 page.
Extended European Search Report for Application No. 19150867.0, mailed on Jun. 6, 2019, 10 pages.
Extended European Search Report for Application No. 19217369.8, mailed on May 15, 2020, 10 pages.
Extended European Search Report for EP Application No. 18209884.8, mailed on Feb. 21, 2019, 8 pages.
Extended European Search Report for EP Application No. 18209886.3, mailed Feb. 27, 2019, 6 pages.
Extended European Search Report for EP Application No. 18209887.1, mailed on Mar. 6, 2019, 9 pages.
Extended European Search Report for EP Application No. 18209888.9, mailed on Feb. 27, 2019, 10 pages.
Extended European Search Report for EP Application No. 18209889.7, mailed on Feb. 25, 2019, 10 pages.
Extended European Search Report for EP Application No. 18209890.5, mailed on Feb. 25, 2019, 9 pages.
Extended European Search Report for EP Application No. 19212759.5, mailed Apr. 14, 2020, 6 pages.
Extended European Search Report for European Application No. 18209885.5, mailed on Mar. 6, 2019, 10 pages.
Gartner et al. "On Graph Kernels: Hardness Results and Efficient Alternatives", COLT/Kernel 2003, Learning Theory and Kernel Machines, Lecture Notes in Computer Science, vol. 2777, 2003, pp. 129-143.
GB Combined Search and Examination Report for GB Application No. 1819700.4, mailed on May 22, 2019, 7 pages.
GB Combined Search and Examination Report for GB Application No. 1819702.0, mailed on May 13, 2019, 7 pages.
Gibson, Michael, "Application and File History for U.S. Appl. No. 16/738,614, filed Jan. 9, 2020". (Copy Not Attached).
Goyal et al. "Capturing Edge Attributes via Network Embedding", IEEE Transactions on Computational Social Systems, vol. 5, No. 4, Apr. 2018, 10 pages.
Goyal et al. "DynGEM: Deep Embedding Method for Dynamic Graphs", University of Southern California, Retrieved from the Internet: https://arxiv.org/pdf/1805.11273.pdf, May 29, 2018, 8 pages.
Grover et al. "node2vec: Scalable Feature Learning for Networks", Available Online at <https://arxiv.org/abs/1607.00653v1>, Jul. 3, 2016, 10 pages.
Guennec et al. "Data Augmentation for Time Series Classification using Convolutional Neural Networks", XP055555602, Retrieved from the Internet: URL: https://aaltd16.irisa.fr/files/2016/08/AALTD16_paper_9.pdf, Sep. 19, 2016, 8 pages.
Han et al. "Learning to Predict Severity of Software Vulnerability Using Only Vulnerability Description", IEEE International Conference on Software Maintenance and Evolution (Icsme), DOI:10.1109/ICSME.2017.52, Sep. 2017, pp. 125-136.
Heimann et al. "On Generalizing Neural Node Embedding Methods to Multi-Network Problems", MLG'17, Aug. 2017, 4 pages.
International Preliminary Report on Patentability for PCT Application No. PCT/EP2019/083205, mailed on Jun. 17, 2021, 9 pages.
International Preliminary Report on Patentability for PCT Patent Application No. PCT/EP2019/083203, mailed on Jun. 17, 2021, 8 pages.
International Preliminary Report on Patentability for PCT Patent Application No. PCT/EP2019/083204, mailed on Jun. 17, 2021, 9 pages.
International Preliminary Report on Patentability for PCT Patent Application No. PCT/EP2019/083206, mailed on Jun. 17, 2021, 9 pages.
International Search Report and Written Opinion for PCT Patent Application No. PCT/EP2019/083203, mailed on Feb. 6, 2020, 14 pages.
International Search Report and Written Opinion for PCT Patent Application No. PCT/EP2019/083204, mailed on Feb. 6, 2020, 16 pages.
International Search Report and Written Opinion for PCT Patent Application No. PCT/EP2019/083205, mailed Mar. 16, 2020, 15 pages.
International Search Report and Written Opinion for PCT Patent Application No. PCT/EP2019/083206, mailed on Feb. 6, 2020, 15 pages.
Ji et al. "The Coming Era of Alpha-Hacking ?: A Survey of Automatic Software Vulnerability Detection, Exploitation and Patching Techniques", 2018 IEEE Third International Conference On Data Science In Cyberspace, XP033375337, Doi: 10.1109/DSC.2018.00017, Jun. 18, 2018, pp. 53-60.
Kim et al. "Web Traffic Anomaly Detection using C-LSTM Neural Networks", Expert Systems with Applications, vol. 105, 2018, pp. 66-76.
Le et al. "Maximal Divergence Sequential Auto-Encoder for Binary Software Vulnerability Detection", preprint during peer review phase ICLR 2019, 2019, 15 pages.
Li et al. "Multivariate Time Series Anomaly Detection: A Framework of Hidden Markov Models", Applied Soft Computing, vol. 60, 2017, pp. 229-240.
Li et al. "VulDeePecker: A Deep Learning-Based System For Vulnerability Detection", Network and Distributed Systems Security (NOSS) Symposium, XP055556046, Retrieved from the Internet [URL:https://arxiv.org/pdf/1801.01681.pdf] on Feb. 13, 2019, Jan. 5, 2018, 15 pages.
Lokman et al. "Optimised Structure of Convolutional Neural Networks for Controller Area Network Classification", 14th International Conference on Natural Computation, Fuzzy Systems and Knowledge Discovery, 2018, pp. 475-481.
Izakian et al. "Clustering Spatiotemporal Data: An Augmented Fuzzy C-Means", IEEE Transactions on Fuzzy Systems, vol. 21, No. 5, Oct. 2013, pp. 855-868.
Muromagi et al. "Linear Ensembles of Word Embedding Models", Proceedings of the 21st Nordic Conference of Computational Linguistics, May 23-24, 2017, pp. 96-104.
National Vulnerability Database "A U.S. government repository of standards-based vulnerability management data represented using the Security Content Automation Protocol (Scap)", NVD is available on the internet: https://nvd.nist.gov/, Dec. 2, 2018, 2 pages.
Niepert et al. "Learning Convolutional Neural Networks for Graphs", Proceedings of the 33rd International Conference on Machine Learning, New York, NY, USA, 2016. JMLR: W&CP vol. 48, arXiv: 1605.05273v4 [cs.LG], Jun. 8, 2016, 10 pages.
Pei et al. "Advances in Knowledge Discovery and Data Mining, Part II", 17th Pacific-Asia Conference, PAKDD 2013, Gold Coast, Australia, Proceedings, Part I, Apr. 2013, 608 pages.

(56) References Cited

OTHER PUBLICATIONS

Quora, "What is data augmentation in machine learning?", available from Internet: https://www.quora.com/What-is-data-augmentation-in-deep-learning (QUORA) relevant with reference to common general knowledge, 3 pages.

Ring et al. "Flow-based Network Traffic Generation Using Generative Adversarial Networks", available from: https://arxiv.org/abs/1810.07795, (RING 1) [see the abstract and whole document and especially note figs 3, 4, 5 and related text], Sep. 27, 2018, 37 pages.

Rumelhart et al. "Learning Internal Representations by Error Propagation", Institute for Cognitive Science Report 8506, Sep. 1985, 49 pages.

Search Report under Section 17 for Great Britain Application No. 1900272.4, mailed on May 28, 2019, 5 pages.

Staudemeyer et al. "Evaluating Performance of Long Short-term Memory Recurrent Neural Networks on Intrusion Detection Data", Proceedings of The South African Institute for Computer Scientists And Information Technologists Conference On, Saicsit '13, Oct. 7-9, 2013, pp. 218-224.

"The PageRank Citation Ranking: Bringing Order to the Web", , Jan. 29, 1998, pp. 1-17.

Vishwanathan et al. "Graph Kernels", Journal of Machine Learning Research, vol. 11, 2010, pp. 1201-1242.

Weisstein, Eric W. "Isomorphic Graphs", WolframMathworld, From MathWorld—A Wolfram Web Resource, Available Online at <https://mathworld.wolfram.com/IsomorphicGraphs.html>, Oct. 2018, 2 pages.

Yu et al. "Learning Deep Network Representations with Adversarially Regularized Autoencoders", Proceedings of the 24th ACM SIGKDD International Conference on Knowledge Discovery & Data Mining, KDD '18, vol. 23, Aug. 19-23, 2018, pp. 2663-2671.

Zhang et al. "Aggregating Neural Word Embeddings for Document Representation", ECIR 2018, Computer Science, Mar. 1, 2018, 12 pages.

Zhang et al. "Robust Network Traffic Classification", IEEE/ACM Transactions on Networking, vol. 23, No. 4, Aug. 2015, pp. 1257-1270.

Zhuo et al. "Network Intrusion Detection using Word Embeddings", 2017 IEEE International Conference on Big Data, 2017, pp. 4686-4695.

\* cited by examiner

DETECTING ANOMALIES IN COMPUTER NETWORKS

PRIORITY CLAIM

The present application is a National Phase entry of PCT Application No. PCT/EP2019/083205, filed Dec. 1, 2019, which claims priority from EP Patent Application No. 18209889.7, filed Dec. 3, 2018, each of which is hereby fully incorporated herein by reference.

TECHNICAL FIELD

The present disclosure relates to the detection of anomalous behavior of a computer system in a computer network.

BACKGROUND

Network connected computer systems, whether physical and/or virtual computer systems connected via one or more physical and/or virtual network communication mechanisms, can be susceptible to malicious attack. For example, one or more computer systems can become infected with malicious software such as botnet agents or the like, and such infected systems can instigate malicious communication with other systems such as communications intended to propagate such infections and/or communications intended to affect the operation of target computer systems (e.g. denial of service attacks, hijacking or the like).

SUMMARY

It is a longstanding desire to detect such malicious communication occurring in a network of computer systems in order that mitigation measures can be implemented.

The present disclosure accordingly provides, in a first aspect, a computer implemented method of detecting anomalous behavior within a computer network, the method comprising: accessing data records each corresponding to an occurrence of communication occurring via the computer network and including a plurality of attributes of the communication; generating, for each of at least a subset of the data records, a training data item for a neural network, the training data item being derived from at least a portion of the attributes of the record and the neural network having input units and output units corresponding to items in a corpus of attribute values for communications occurring via the network; augmenting the training data by replicating each of one or more training data items responsive to one or more attributes of the data record corresponding to the training data item; training the neural network using the augmented training data so as to define a vector representation for each attribute value in the corpus based on weights in the neural network for an input unit corresponding to the attribute value; repeating the accessing, generating, augmenting and training steps to generate multiple generations of vector representations for each attribute value in the corpus, each generation corresponding to data records received during a different time period; and for at least a subset of attribute values in the corpus, comparing the multiple generations of vector representations to identify a change in one or more vector representation as an indication of an anomalous change of behavior in the computer network.

In some embodiments, the method further comprises, responsive to the identification of an anomalous change of behavior in the computer network, implementing one or more protective measures.

In some embodiments, the protective measures include one or more of: deploying and/or configuring a firewall at one or more computer systems connected via the computer network; deploying and/or configuring anti-malware facility at one or more computer systems connected via the computer network; deploying and/or configuring an antivirus facility at one or more computer systems connected via the computer network; adjusting a sensitivity and/or level of monitoring of a security facility in one or more computer systems connected via the computer network; and selectively disconnecting one or more computer systems from the computer network.

In some embodiments, the attributes of a communication include one or more of: an address of a source of the communication; an address of a destination of the communication; an identification of a communications port at a source of the communication; an identification of a communications port at a destination of the communication; an identifier of a protocol of the communication; a size of the communication; a number of packets of the communication; a set of network protocol flags used in the communication; a timestamp of the communication; and a duration of the communication.

In some embodiments, the neural network has a single layer of hidden units logically arranged between the input units and the output units.

In some embodiments, augmenting the training data comprises replicating training data items in response to a determination that a value of a size attribute of a data record corresponding to the training data item exceeds a predetermined threshold size.

In some embodiments, the size attribute for the data record corresponds to a size of a characteristic of a communication associated with the data record as one of: a size of the communication; a number of packets in the communication; a number of bytes in the communication; and a duration of the communication.

In some embodiments, comparing multiple generations of vector representations for an attribute value includes performing a vector similarity function on the vector representations to determine a degree of similarity.

In some embodiments, the identification of a change in a vector representation indicative of an anomalous change includes detecting a vector similarity below a predetermined threshold degree of similarity.

In some embodiments, the repeating the accessing occurs periodically according to a predetermined time schedule such that data records are accessed for each of a plurality of time periods.

In some embodiments, comparing the multiple generations of vector representations includes, for each of one or more attribute values in the corpus, training a recurrent neural network based on the multiple generations of vector representations such that the trained recurrent neural network is suitable for classifying a subsequent vector representation as anomalous in relation to multiple generations of vector representations.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE FIGURES

Embodiments of the present disclosure will now be described, by way of example only, with reference to the accompanying drawings, in which.

DETAILED DESCRIPTION OF EMBODIMENTS

Figure 1:
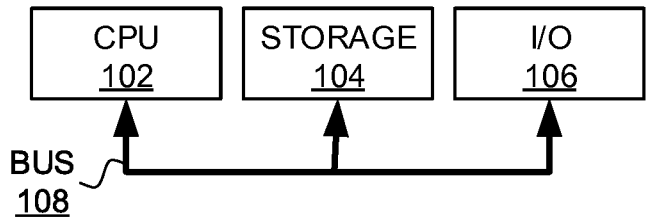
FIG. 1 is a block diagram a computer system suitable for the operation of embodiments of the present disclosure.

Embodiments of the present disclosure address the challenge of detecting anomalous behavior of computer systems communicating via a computer network by detecting anomalies in network communications occurring via the computer network. Such anomalies are detected based on representations of network communications known as embeddings in which each network communication is represented as a plurality of vector representations, each vector corresponding to an attribute of the communication including, for example, inter alia: a source address, a destination address, a source port, a destination port, a size, a number of packets, a timestamp, a duration, a network protocol, one or more network protocol parameters and other attributes as will be apparent to those skilled in the art. Thus, each communication occurring in the computer network can be represented as a plurality of vector representations (known as embeddings) that serve to characterize the communication, with multiple such communications being so encoded. Such embeddings serve to characterize typical network communication within the computer network. For example, embeddings generated during one or more time periods when the network is known to be absent malicious intervention serve to characterize the operation of the network devoid of such malicious intervention. Such embeddings can be considered baseline embeddings. Embeddings generated for subsequent time periods and, in some embodiments, continuously, can be compared against such baseline embeddings to detect changes occurring in the network communications via the network. Such changes can be considered anomalous, such as when a change exceeds a predetermined threshold degree of change, with the detection of such anomalies being used to trigger responsive measures such as network or computer system protective measures.

The generation of the vector representations as embeddings is achieved by training a fully connected neural network with a single hidden layer smaller than input and output layers. Each node in each of the input and output layers corresponds to a value of an attribute of a network communication such that all possible attribute values (across potentially multiple attribute types, such as addresses, protocols, ports etc.) constitute a corpus of attribute values for communications occurring via the network. Thus, preferably, the entire corpus of attribute values is represented by a node in each of the input layer and the output layer. The neural network is trained using training data derived from records of communication from which attribute values are extracted. Such an approach to the generation of embeddings is described in detail in "IP2Vec: Learning Similarities between IP Addresses" (Ring et al, 2017 IEEE International Conference on Data Mining Workshops) which itself builds upon the approach described in detail in "Efficient Estimation of Word Representations in Vector Space" (Mikolov et al., ArXiv, CoRR (Computing Research Repository), 2013). Both Ring et al. and Mikolov et al. are specifically cited here for their respective disclosures which, combined with the present specification, are to be read to provide sufficient disclosure of the present disclosure.

Embodiments of the present disclosure improve upon the approach of Ring et al. by the use of pre-processing of training data to enhance the characterisation of network communication in the generated embeddings. Further, post-processing of embeddings is provided to improve anomaly detection.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
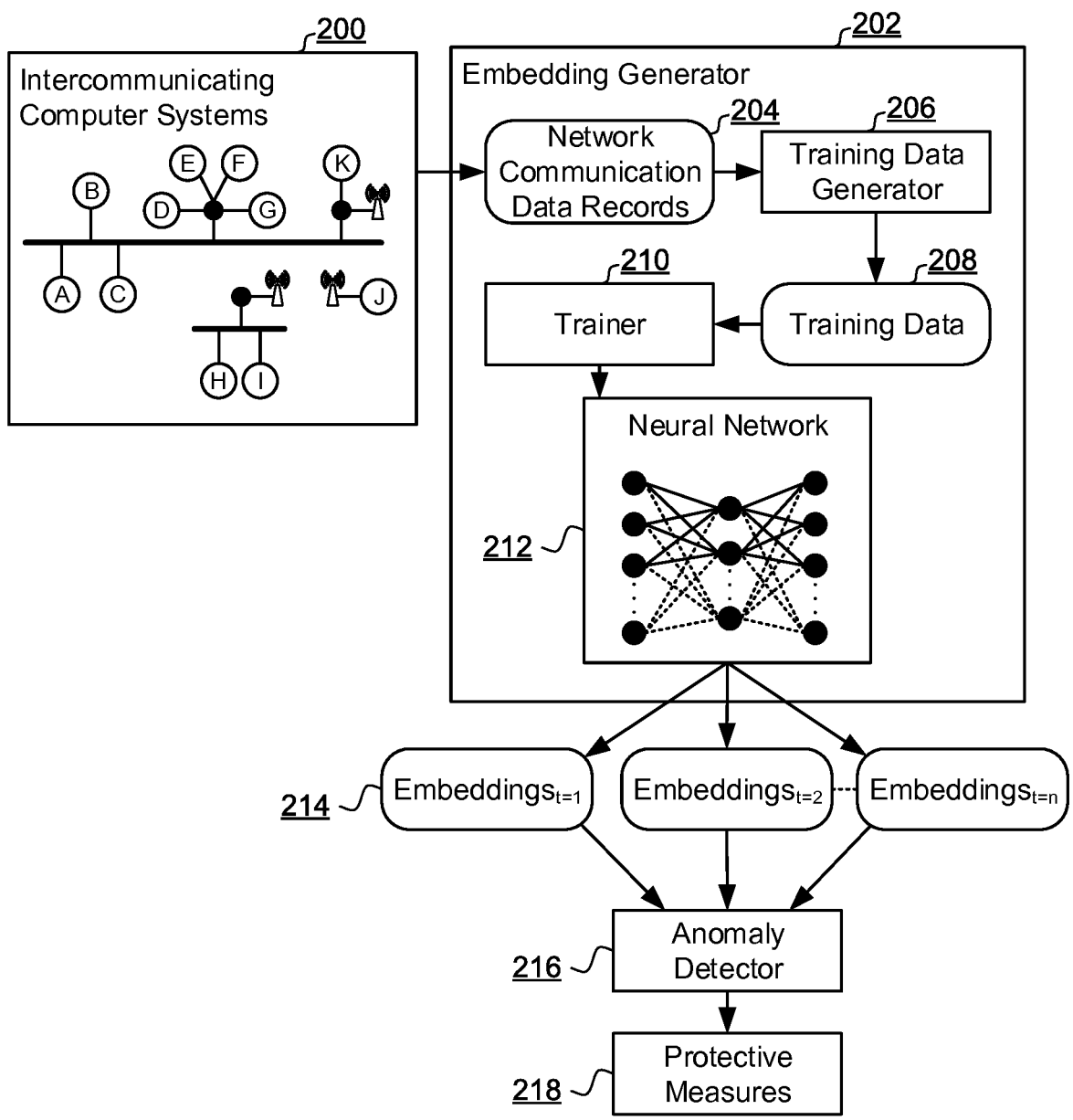
FIG. 2 is a component diagram of an arrangement for detecting anomalous behavior within a computer network in accordance with embodiments of the present disclosure.

FIG. 2 is a component diagram of an arrangement for detecting anomalous behavior within a computer network in accordance with embodiments of the present disclosure. An exemplary network of intercommunicating computer systems 200 is illustrated comprising one or more virtual or physical network elements such as wired, wireless, cellular, local area, wide area and other networks. Communicatively connected via the network are physical and/or virtual computer systems indicated as A through K. The computer systems intercommunicate via the network using one or more networking protocols such that each network communication includes attributes as features of the communication. Such attributes for a communication can include, inter alia: an address of a source of the communication; an address of a destination of the communication; an identification of a communications port at a source of the communication; an identification of a communications port at a destination of the communication; an identifier of a protocol of the communication; a size of the communication; a number of packets of the communication; a set of network protocol flags used in the communication; a timestamp of the communication; a duration of the communication; and other attributes as will be apparent to those skilled in the art.

An embedding generator 202 is provided as a software, hardware, firmware or combination component suitable for receiving network communication data records 204 in respect of network communications occurring via the computer network. Each network communication data record 204 is a record of an occurrence of communication occurring between computer systems via the network. For example, a tool suitable for generating network communication data records 204 is NetFlow. NetFlow enables devices such as routers, switches, monitors and computer systems to analyse traffic passing through, for example, a network interface. Each record of NetFlow data represents a network flow, i.e., a unidirectional sequence of network packets between endpoints. Each flow can be described by, inter alia:

source and destination addresses; source and destination port numbers; a protocol; a number of bytes; a number of packets; a timestamp; a duration; and a type of service. One challenges in processing NetFlow data is its sheer size, its sparsity, and the fact that is hard for the human eye to interpret it. Hence there is a need for automated ways of processing this type of data.

The embedding generator 202 includes a training data generator 206 as a software, hardware, firmware or combination component arranged to access the network communication data records and generate training data for a neural network 212. In some embodiments, the training data is generated according to the approach of Ring et al. (see, in particular, section IV of Ring et al. and the example illustrated in FIG. 3 of Ring et al.) such that each network communication data record 204 is used to generate a plurality of training data items. Notably, the particular selection of context in Ring et al. as a subset of the fields of each network communication data record 204 (a flow in Ring et al.) can be adapted and predefined for a particular implementation and/or application of embodiments of the present disclosure according to need. For example, more or fewer attributes of network communication data records 204 can be included in the generation of training data items. Thus, the training data generator 206 generates the training data 208 that is subsequently used by a neural network trainer 210 to train the neural network 212. The trainer 210 is a software, hardware, firmware or combination component arranged to read training data items 208 and apply them through a neural network training process to adjust the interconnection weights in the neural network 212. For example, each training data item 208 can be constituted as a pair of attribute values for a single network communication data record 204, the attribute values existing in the corpus of all attribute values for network communication data records 204 with a first attribute value being used to trigger an input node corresponding to that attribute value in the neural network, and the second attribute value being used as a desired output of the neural network. A backpropagation training algorithm can be applied to train the neural network using such pairs of values (see, for example, "Learning internal representations by backpropagating errors", D. E. Rumelhart, G. E. Hinton, R. J. Williams, September 1985, Institute for Cognitive Science Report 8506, University of California, San Diego). In some embodiments, the neural network 212 is trained using stochastic gradient descent and backpropagation.

Figure 3:
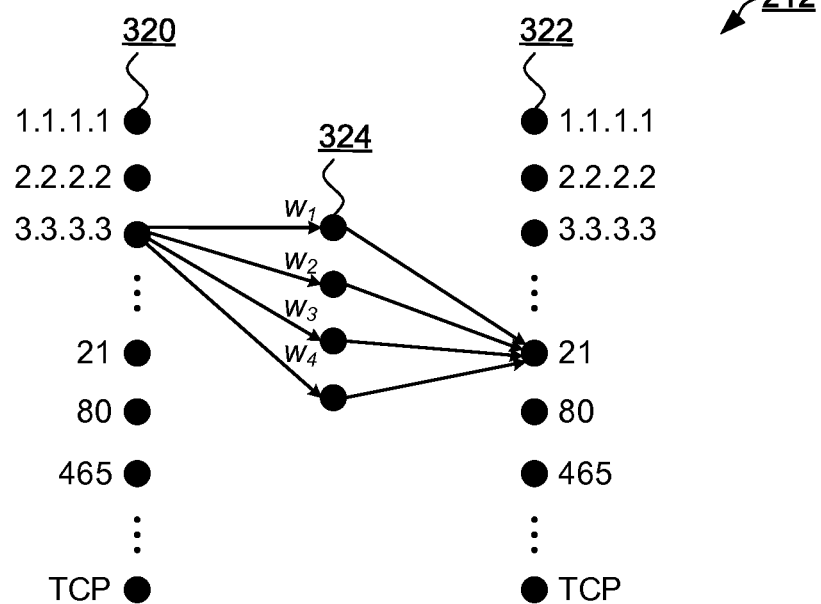
FIG. 3 depicts a partial exemplary neural network suitable for operation in embodiments of the present disclosure.

Once trained, the neural network 212 serves as a basis for defining embeddings 214 for each attribute value in the corpus based on the data used to train the neural network 212. According to Ring et al., for a particular attribute value, a vector constituted by the values of the weights of all connections in the neural network 212 from an input node corresponding to the attribute value to each hidden node can constitute a vectoral embedding for the attribute value. Referring now to FIG. 3 which depicts a partial exemplary neural network 212 suitable for operation in embodiments of the present invention. The neural network 212 of FIG. 3 is a partial representation because it shows only the connections between a single input node and hidden nodes, and between the hidden nodes and an output node. The neural network 212 of FIG. 3 depicts a set of input nodes 320 each corresponding to attribute values for a network communication. By way of example, the input nodes 320 are depicted including attribute values for network addresses, ports and network protocols. The exemplary input nodes 320 depicted include network addresses as internet protocol (IP) addresses 1.1.1.1, 2.2.2.2 and 3.3.3.3. Further, the exemplary input nodes 320 depicted include network ports 21, 80 and 465. Further, the exemplary input nodes 320 depicted include the network protocol "TCP" (transmission control protocol). Equivalent output nodes 322 are also provided. FIG. 3 also depicts the weights $w_1$, $w_2$, $w_3$ and $w_4$ of connections between one input node for IP address 3.3.3.3 and a set of hidden units 324. In FIG. 3, the neural network 212 is trained with the sample {3.3.3.3, 21}, so indicated by the weighted connections between the node for 3.3.3.3 and the hidden units, and between the hidden units and output node 21. A vector with the components $w_1$, $w_2$, $w_3$ and $w_4$ thus constitutes a vector representation of the IP address 3.3.3.3 and is an embedding for IP address 3.3.3.3.

According to embodiments of the present disclosure, multiple such embeddings 214 are generated for multiple different time periods such that each embedding 214 is derived from the neural network 212 trained using training data 208 generated from network communication data records 204 occurring within that time period. In this way, multiple generations of vector representations for each attribute value in the corpus are generated, each generation corresponding to data records received during a different time period. A time period can be defined such as by way of start and end times, a start time and duration, a start time and end-condition, start and end conditions, or other mechanisms for defining a time period as will be apparent to those skilled in the art. Accordingly, for each time period t, network communication data records 204 arising within the time period are collected and used to generate training data 208 associated with that time period. The neural network 212 is trained using training data 208 for the time period and embeddings 214 are defined as vector representations of weights in the trained neural network 212 for at least a subset of the attribute values represented by the input nodes 320. In some embodiments, only the weights from an input node 320 to hidden nodes 324 are used in the vector representation. Vector representations for a time t period are then stored as embeddings associated with the period t thus: embeddings$_{t=1}$, embeddings$_{t=2}$ ... embeddings$_{t=n}$.

FIG. 2 also includes an anomaly detector 216 as a software, hardware, firmware or combination component operable to receive a plurality of embeddings 214 for comparison. In particular, the anomaly detector 216 performs a similarity analysis on a pair of vector representations for an attribute value, each vector representation corresponding to an embedding 214 generated for a different time period. In this way, differences between embeddings between time periods for a communications attribute value can be discerned and, where such differences meet or exceed a threshold degree of difference, a determination of the existence of an anomaly in the operation of a computer system communicating via the network can be made. The anomaly detector 216 can make the vector comparison using a vector similarity function such as a cosine similarity function for comparing vectors as is known in the art. Where a subsequent vector representation for a communications attribute value is sufficiently dissimilar to a vector for the attribute in a different time period (such as a baseline time period corresponding to a period during which computer systems are known to be unencumbered by malware), then an anomaly is identified. Sufficiency of dissimilarity (or similarity) can be predetermined in terms of a degree of difference characterized in dependence on the particular vector similarity function employed—such as an angular difference, an extent of vectoral magnitude difference or a combination or other such characterizations of difference as will be apparent to those skilled in the art. Protective measures 218 can be implemented to protect one or more of the computer systems in the set of intercommunicating computer systems 200 in dependence on the detection of an anomaly by the anomaly detector 216.

Protective measures 218 are deployable software, hardware, firmware or combination facilities or features that can include, for example, the deployment of firewalls, new security measures, additional authentication or authorization checks, execution or updating of antimalware services, preventing communication with one or more computer systems or the whole set of intercommunicating computer systems 200, increasing a level of monitoring, tracing or logging and other protective measures as will be apparent to those skilled in the art. Thus, in use, the embedding generator 202 coupled with the anomaly detector 216 provide for the effective characterization of network communications occurring via a computer network as vector representations of communication attribute values (embeddings 214) for each of a plurality of time periods such that anomalies detected between vector representations can trigger the deployment of protective measures 218.

In one embodiment, a new neural network 212 is trained afresh for each different time period for which the embedding generator 202 operates. Thus, the neural network 212 for a time period is trained using training data 208 derived from network communication data records 204 for communications occurring only within that time period, and each embedding 214 is derived from the neural network 212 accordingly. In accordance with an alternative embodiment, a single neural network 212 is used for all time periods such that the same neural network 212 is trained initially for a first time period t=1 and is further trained (constructively) for each subsequent time period t=2 to t=n for n time periods. In such an approach the embeddings for each time period $embedding_{t=1}$, $embedding_{t=2}$ ... $embedding_{t=n}$ constitute a development of an embedding for a preceding time period. Consequently, a series of embeddings arising from multiply training the same neural network 212 constitute a temporal sequence of embeddings suitable for training a further neural network as a recurrent neural network. Recurrent neural networks can be used to analyze sequential data due to their ability to take multiple inputs one after the other and save state information between inputs. Such recurrent neural networks can be trained in an unsupervised way by making the target output at each step the embeddings for a next step (prediction) or by training a sequence-to-sequence model to reconstruct the entire sequence (autoencoder). Prediction or reconstruction errors derived from a recurrent neural network can then be used by the anomaly detector 216 to indicate how likely a given sequence of embeddings is to be anomalous in comparison to normal sequences used during training. Thus, the anomaly detector 216 can be adapted to comparing multiple generations of vector representations by training a recurrent neural network for each of one or more attribute values in the corpus based on the multiple generations of vector representations. In this way, the trained recurrent neural network is suitable for classifying a subsequent vector representation as anomalous in relation to multiple generations of vector representations.

Figure 4:
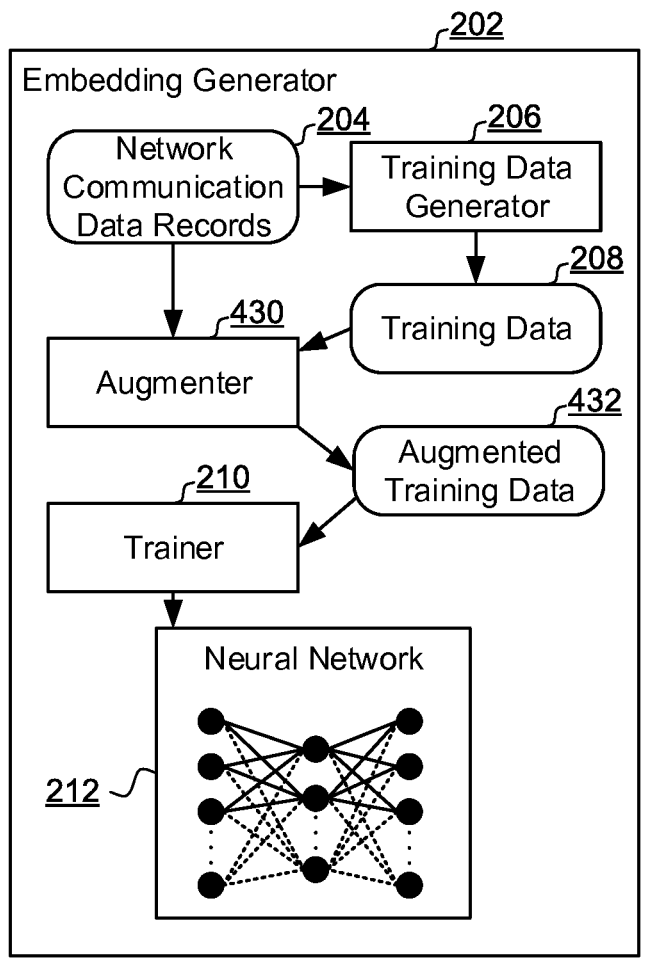
FIG. 4 is a component diagram of the embedding generator of FIG. 2 including an augmenter component according embodiments of the present disclosure.

FIG. 4 is a component diagram of the embedding generator of FIG. 2 including an augmenter component according embodiments of the present disclosure. Many of the elements of FIG. 4 are identical to those described above with respect to FIG. 2 and these will not be repeated here. FIG. 4 is further adapted according to some embodiments of the present disclosure to enhance the training 208 by augmenting it. Thus, the embedding generator 202 of FIG. 4 includes an augmenter 432 as a software, hardware, firmware or combination component arranged to receive or access each item of the training data 208 and the network communication data records 204 on the basis of which the training data 208 was generated, and to generate augmented training data 432 corresponding to the training data 208 with augmentations. The augmented training data 432 is then used by the trainer 210 to train the neural network 212 as previously described.

Specifically, the augmenter 430 performs augmentation of the training data 208 by replicating training data items so that they appear more than once in the augmented training data 432. A determination of whether to replicate a training data item is made based on one or more attributes of a network communication data record 204 corresponding to the training data item. The replication may involve mere duplication of one, more than one or all training data items generated based on a network communication record 204, or repetition of such training data items multiple times in the augmented training data 432. In this way, characteristics of network communication data records 204 deemed significant (based on one or more attribute values thereof) are emphasized in the augmented training data 432 by replication of training data items. In one embodiment, such significance is determined based on a value of one or more attributes in a network communication data record 204 corresponding to a size of a network communication, such that more sizeable communications (e.g. communications with more data, a larger payload, a longer duration or the like) are emphasized in the augmented training data 432 by replication of training data items. For example, the augmenter 430 can augment training data 208 to augmented training data 432 by replicating training data items in response to a determination that a value of a size attribute of a network communication data record 204 corresponding a training data item exceeds a predetermined threshold.

In one embodiment, training data items are replicated based on a duration of communication indicated within a network communication data record 204 as a communication flow duration. Let T_flow be a flow duration for a network communication, and T_max be a predetermined maximum duration (such as a maximum duration deemed plausible or a selected maximum duration). For each network communication data record 204, a number of times m a training data item 208 is to be replicated (i.e. a number of times a single training data item should exist in the augmented training data 432) is calculated as:

$$m=\lceil T\_flow/T\_max \rceil$$

where ⌈•⌉ denotes the ceiling operator. Hence, after augmentation, m training data items will be produced in the augmented training data 432 for each training data item generated in the training data 208 for the single network communication data record 204. In some embodiments, the duplicate data items are identical to an original training data item except that training data item corresponding to a duration (in this example) is adjusted to reflect the replication such that the duration for the first m−1 training data items is T_max, and the duration for a final training data item is T_flow-(m-1)T_max.

Figure 5:
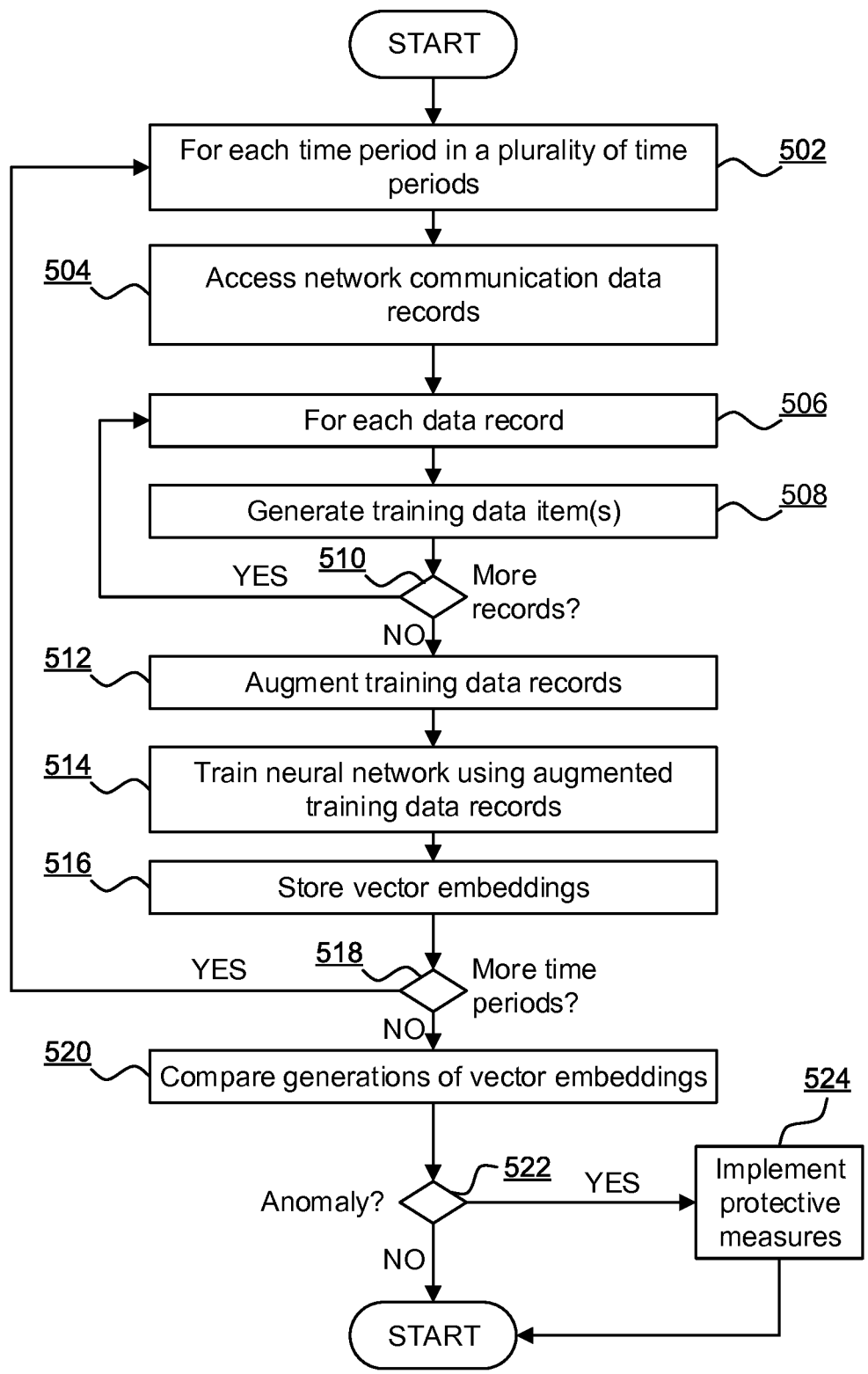
FIG. 5 is a flowchart of an exemplary method of detecting anomalous behavior within a computer network in accordance with embodiments of the present disclosure.

FIG. 5 is a flowchart of an exemplary method of detecting anomalous behavior within a computer network in accordance with embodiments of the present disclosure. Initially, at 502, the method commences an iteration through a series of predetermined or determinable time periods t. At 504 a set of network communication data records 204 for the time period are accessed. At 506 an iteration is commenced for each data record in the set of accessed network communication data records 204. At 508 the method generates one or more training data items for the current network communication data record 204. At 510 the iteration continues for all network communication data records 204. According to some embodiments, the method subsequently augments, at 512, the set of all training data items generated at 508 for the current time period t by the augmentor 430 as previously described. At step 514 the neural network 212 is trained using the training data 208 (or, where augmented, the augmented training data 432). At 516 the vector embeddings 214 for each value in the corpus of attribute values are stored for the current time period t. At 518 the method iterates for all time periods. Subsequently, at 520, the anomaly detector 216 compares generations of vector representation embeddings 214, e.g. using a vector similarity function such as cosine similarity. At 522 detected anomalies lead to 524 at which protective measures are deployed.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of detecting anomalous behavior within a computer network, the method comprising:
   accessing data records each corresponding to an occurrence of communication occurring via the computer network and including a plurality of attributes of the communication;
   generating, for each of at least a subset of the data records, a training data item for a neural network, the training data item being derived from at least a portion of the attributes of the data record and the neural network having input units and output units corresponding to items in a corpus of attribute values for communications occurring via the computer network;
   augmenting the training data by replicating each of one or more training data items responsive to one or more attributes of the data record corresponding to the training data item;
   training the neural network using the augmented training data so as to define a vector representation for each attribute value in the corpus based on weights in the neural network for an input unit corresponding to the attribute value;
   repeating the accessing, the generating, the augmenting and the training to generate multiple generations of vector representations for each attribute value in the corpus, each generation corresponding to data records received during a different time period; and
   for at least a subset of attribute values in the corpus, comparing the multiple generations of vector representations to identify a change in one or more vector representation as an indication of an anomalous change of behavior in the computer network.

2. The method of claim 1, further comprising, responsive to the identification of an anomalous change of behavior in the computer network, implementing one or more protective measures.

3. The method of claim 2, wherein the protective measures include one or more of: deploying or configuring a firewall at one or more computer systems connected via the computer network; deploying or configuring anti-malware facility at one or more computer systems connected via the computer network; deploying or configuring an antivirus facility at one or more computer systems connected via the computer network; adjusting a sensitivity or a level of monitoring of a security facility in one or more computer systems connected via the computer network; or selectively disconnecting one or more computer systems from the computer network.

4. The method of claim 1, wherein the attributes of a communication include one or more of: an address of a source of the communication; an address of a destination of the communication; an identification of a communications port at a source of the communication; an identification of a communications port at a destination of the communication; an identifier of a protocol of the communication; a size of the communication; a number of packets of the communication; a set of network protocol flags used in the communication; a timestamp of the communication; or a duration of the communication.

5. The method of claim 1, wherein the neural network has a single layer of hidden units logically arranged between the input units and the output units.

6. The method of claim 1, wherein augmenting the training data comprises replicating training data items in response to a determination that a value of a size attribute of a data record corresponding to the training data item exceeds a predetermined threshold size.

7. The method of claim 6, wherein the size attribute for the data record corresponds to a size of a characteristic of a communication associated with the data record as one of: a size of the communication; a number of packets in the communication; a number of bytes in the communication; or a duration of the communication.

8. The method of claim 1, wherein comparing multiple generations of vector representations for an attribute value includes performing a vector similarity function on the vector representations to determine a degree of similarity.

9. The method of claim 8, wherein the identification of a change in a vector representation indicative of an anomalous change includes detecting a vector similarity below a predetermined threshold degree of similarity.

10. The method of claim 1, wherein repeating the accessing occurs periodically according to a predetermined time schedule such that data records are accessed for each of a plurality of time periods.

11. The method of claim 1, wherein comparing the multiple generations of vector representations includes, for each of one or more attribute values in the corpus, training a recurrent neural network based on the multiple generations of vector representations such that the trained recurrent neural network is suitable for classifying a subsequent vector representation as anomalous in relation to multiple generations of vector representations.

12. A computer system comprising:
    a processor and memory storing computer program code for performing the steps of the method of claim 1.

13. A non-transitory computer-readable storage element storing computer program code to, when loaded into a computer system and executed thereon, cause the computer to perform the method as claimed in claim 1.

\* \* \* \* \*